US012715219B2

(12) United States Patent
Katsuda et al.

(10) Patent No.: US 12,715,219 B2
(45) Date of Patent: Aug. 25, 2026

(54) LIQUID EJECTION DEVICE

(71) Applicant: SEIKO EPSON CORPORATION, Tokyo (JP)

(72) Inventors: Osamu Katsuda, Matsumoto (JP); Tomoki Abe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 128 days.

(21) Appl. No.: 18/439,871

(22) Filed: Feb. 13, 2024

(65) Prior Publication Data

US 2024/0278579 A1 Aug. 22, 2024

(30) Foreign Application Priority Data

Feb. 16, 2023 (JP) ................................ 2023-022475

(51) Int. Cl.
*B41J 2/175* (2006.01)
*B41J 2/02* (2006.01)
*B41J 2/03* (2006.01)

(52) U.S. Cl.
CPC ................ *B41J 2/175* (2013.01); *B41J 2/03* (2013.01); *B41J 2/17596* (2013.01); *B41J 2002/022* (2013.01)

(58) Field of Classification Search
CPC . B41J 2/175; B41J 2/03; B41J 2/17596; B41J 2002/022; B05B 9/04
USPC .......................................................... 347/7
See application file for complete search history.

(56) References Cited

U.S. PATENT DOCUMENTS

| | | | | |
|---|---|---|---|---|
| 4,278,984 | A * | 7/1981 | Matsumoto | F04B 23/06 347/85 |
| 2016/0158784 | A1* | 6/2016 | Fehr | B05B 9/0413 239/569 |
| 2022/0323980 | A1 | 10/2022 | Katsuda | |

FOREIGN PATENT DOCUMENTS

| | | | |
|---|---|---|---|
| JP | 2022161194 | A | 10/2022 |

* cited by examiner

*Primary Examiner* — Jason S Uhlenhake
*Assistant Examiner* — Alexander D Shenderov
(74) *Attorney, Agent, or Firm* — CHIP LAW GROUP

(57) ABSTRACT

A liquid ejection device includes an ejector configured to eject a liquid in a continuous flow, form the continuous flow into droplets, and cause a collision with an object in a form of the droplets, a liquid feeder includes a liquid reservoir, a displacement part, and a drive unit, the displacement part is placed to increase a volume of the liquid reservoir chamber when displaced to increase a volume of the first pressure chamber relative to the volume of the liquid reservoir, and decrease the volume of the liquid reservoir chamber when displaced to increase a volume of the second pressure chamber relative to the volume of the liquid reservoir, the displacement part is displaced to increase the volume of the first pressure chamber at a suction operation, and the displacement part is displaced to increase the volume of the second pressure chamber at an ejection operation.

10 Claims, 5 Drawing Sheets

LIQUID EJECTION DEVICE

The present application is based on, and claims priority from JP Application Serial Number 2023-022475, filed Feb. 16, 2022, the disclosure of which is hereby incorporated by reference herein in its entirety.

BACKGROUND

1. Technical Field

The present disclosure relates to a liquid ejection device.

2. Related Art

In related art, various liquid ejection devices ejecting liquids to objects are used. The liquid ejection devices include a liquid ejection device having an ejector, a liquid feeder, and a liquid channel coupling the ejector and the liquid feeder. For example, JP-A-2022-161194 discloses a liquid ejection device including an ejection nozzle as an ejector, a liquid feeder having a cylinder and a piston, and a liquid channel.

The liquid ejection device disclosed in JP-A-2022-161194 executes a discharge operation by causing a flow of a gas sent out from a regulator forming the liquid feeder into a gas reservoir portion of the cylinder and pressurizing to press the piston into the cylinder with a gas pressure. In the liquid ejection device in related art including the ejector, the liquid feeder, and the liquid channel like the liquid ejection device disclosed in JP-A-2022-161194, only one pressure applying part for moving the piston is provided for one cylinder, and it is difficult to finely control and execute an ejection operation and a suction operation of a liquid.

SUMMARY

A liquid ejection device according to an aspect of the present disclosure in order to solve the above described problem is a liquid ejection device including an ejector configured to eject a liquid in a continuous flow, form the continuous flow into droplets, and cause a collision with an object in a form of the droplets, a liquid feeder, a liquid channel coupling the ejector and the liquid feeder, and a controller, wherein the liquid feeder includes a liquid reservoir having a liquid reservoir chamber coupled to the liquid channel and configured to reserve the liquid, a displacement part dividing the liquid reservoir into the liquid reservoir chamber, a first pressure chamber, and a second pressure chamber and displaced relative to the liquid reservoir to change volumes of the liquid reservoir chamber, the first pressure chamber, and the second pressure chamber, and a drive unit displacing the displacement part relative to the liquid reservoir, the displacement part is placed to increase the volume of the liquid reservoir chamber when displaced to increase the volume of the first pressure chamber relative to the liquid reservoir, and decrease the volume of the liquid reservoir chamber when displaced to increase the volume of the second pressure chamber relative to the liquid reservoir, and the controller controls the drive unit to displace the displacement part to increase the volume of the first pressure chamber at a suction operation of suctioning the liquid into the liquid reservoir chamber, and controls the drive unit to displace the displacement part to increase the volume of the second pressure chamber at an ejection operation of ejecting the liquid from the ejector.

DESCRIPTION OF EMBODIMENTS

Figure 1:
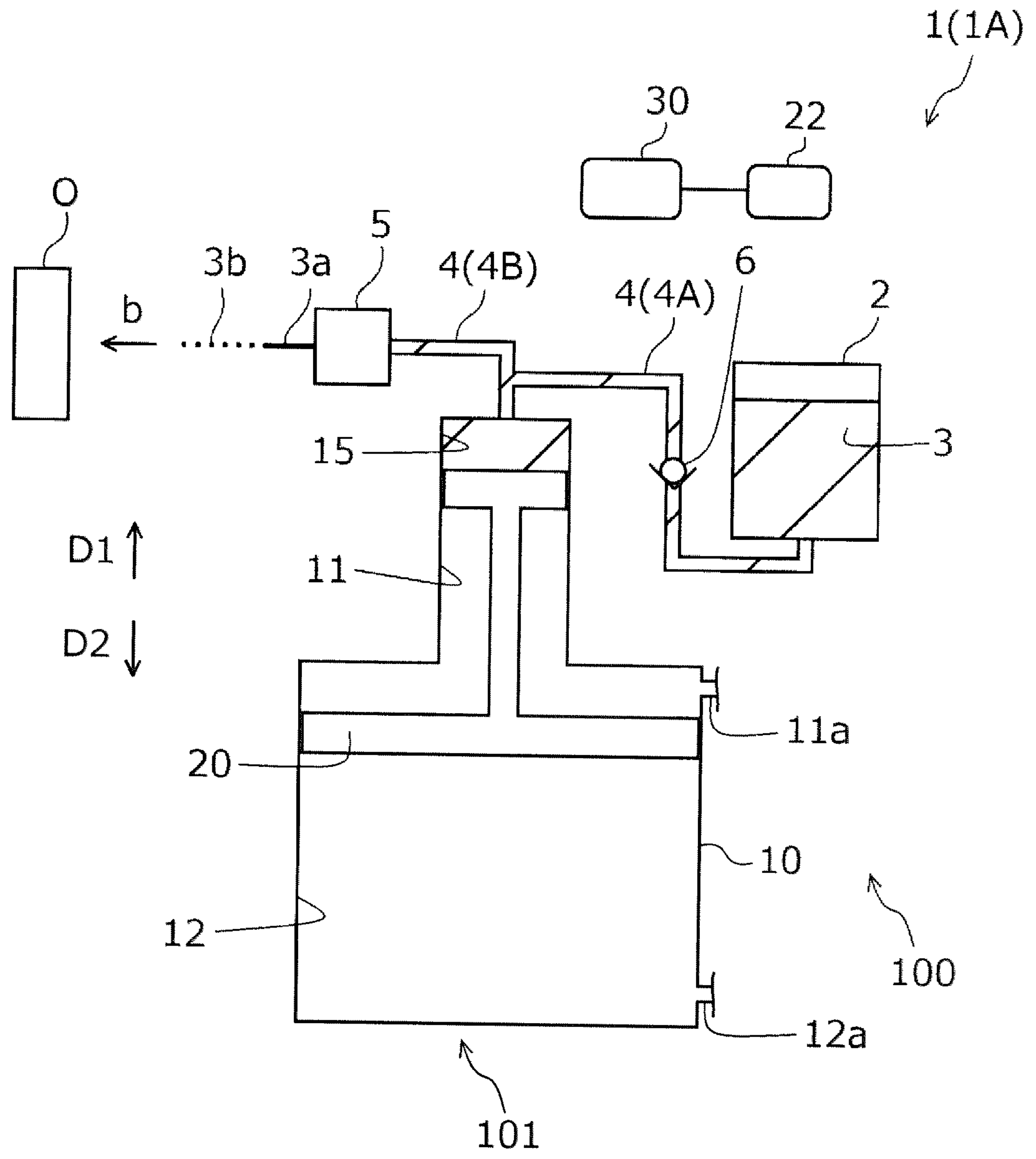
FIG. 1 is a schematic diagram showing a liquid ejection device of Embodiment 1 of the present disclosure.

First, the present disclosure will be schematically described.

A liquid ejection device in a first mode of the present disclosure in order to solve the above described problem is a liquid ejection device including an ejector configured to eject a liquid in a continuous flow, form the continuous flow into droplets, and cause a collision with an object in a form of the droplets, a liquid feeder, a liquid channel coupling the ejector and the liquid feeder, and a controller, wherein the liquid feeder includes a liquid reservoir having a liquid reservoir chamber coupled to the liquid channel and configured to reserve the liquid, a displacement part dividing the liquid reservoir into the liquid reservoir chamber, a first pressure chamber, and a second pressure chamber and displaced relative to the liquid reservoir to change volumes of the liquid reservoir chamber, the first pressure chamber, and the second pressure chamber, and a drive unit displacing the displacement part relative to the liquid reservoir, the displacement part is placed to increase the volume of the liquid reservoir chamber when displaced to increase the volume of the first pressure chamber relative to the volume of the liquid reservoir, and decrease the volume of the liquid reservoir chamber when displaced to increase the volume of the second pressure chamber relative to the volume of the liquid reservoir, and the controller controls the drive unit to displace the displacement part to increase the volume of the first pressure chamber at a suction operation of suctioning the liquid into the liquid reservoir chamber, and controls the drive unit to displace the displacement part to increase the volume of the second pressure chamber at an ejection operation of ejecting the liquid from the ejector.

According to the mode, the liquid feeder has the liquid reservoir and the displacement part dividing the liquid reservoir into the liquid reservoir chamber, the first pressure chamber, and the second pressure chamber and displaced relative to the liquid reservoir to change the volumes of the liquid reservoir chamber, the first pressure chamber, and the second pressure chamber. That is, the first pressure chamber and the second pressure chamber as a plurality of pressure applying parts for moving the displacement part are provided for one liquid reservoir. Accordingly, the controller may finely control and execute the ejection operation and the suction operation of the liquid.

In a liquid ejection device in a second mode of the present disclosure according to the first mode, the drive unit displaces the displacement part relative to the liquid reservoir by inputting and outputting a fluid into or out of at least one of the first pressure chamber and the second pressure chamber.

According to the mode, the drive unit displaces the displacement part relative to the liquid reservoir by inputting and outputting the fluid into or out of at least one of the first pressure chamber and the second pressure chamber. According to the configuration, the displacement part may be accurately displaced and the controller may particularly finely control and execute the ejection operation and the suction operation of the liquid.

In a liquid ejection device in a third mode of the present disclosure according to the first or second mode, the drive unit has an elastic member in at least one of the first pressure chamber and the second pressure chamber and displaces the displacement part relative to the liquid reservoir by an elastic force of the elastic member.

According to the mode, the drive unit has the elastic member in at least one of the first pressure chamber and the second pressure chamber and displaces the displacement part relative to the liquid reservoir by the elastic force of the elastic member. According to the configuration, the configuration displacing the displacement part may be simpler.

In a liquid ejection device in a fourth mode of the present disclosure according to the second mode, the liquid feeder has a fluid channel connecting the first pressure chamber and the second pressure chamber, and the controller controls the fluid to flow into the second pressure chamber at the ejection operation and controls the fluid to be used for the suction operation to flow from the second pressure chamber into the first pressure chamber.

According to the mode, the liquid feeder has a fluid channel connecting the first pressure chamber and the second pressure chamber, and the controller controls the fluid to flow into the second pressure chamber at the ejection operation and controls the fluid to be used for the suction operation to flow from the second pressure chamber into the first pressure chamber. According to the configuration, the fluid used in the ejection operation and the suction operation may be reused.

In a liquid ejection device in a fifth mode of the present disclosure according to the fourth mode, the liquid feeder has an atmospheric open channel opening the fluid to an atmosphere in a part of the fluid channel.

According to the mode, the liquid feeder has the atmospheric open channel opening the fluid to the atmosphere in the part of the fluid channel. According to the configuration, the configuration of reusing the fluid used in the ejection operation and the suction operation may be simpler.

In a liquid ejection device in a sixth mode of the present disclosure according to the fourth mode, the liquid feeder has a flow direction changing part coupled to the fluid channel in three or more locations and configured to change a direction in which the fluid flows from a first direction to a second direction, and the controller controls the flow direction changing part to change the direction in which the fluid flows between the first direction and the second direction.

According to the mode, the liquid feeder has the flow direction changing part coupled to the fluid channel in the three or more locations and configured to change the direction in which the fluid flows from the first direction to the second direction, and the controller controls the flow direction changing part to change the direction in which the fluid flows between the first direction and the second direction. According to the configuration, in the configuration of reusing the fluid used in the ejection operation and the suction operation, the displacement part may be accurately displaced and the controller may particularly finely control and execute the ejection operation and the suction operation of the liquid.

In a liquid ejection device in a seventh mode of the present disclosure according to the fourth mode, the liquid feeder has a regulator regulating a pressure of the fluid flowing in the fluid channel.

According to the mode, the liquid feeder has the regulator regulating the pressure of the fluid flowing in the fluid channel. Accordingly, the displacement part may be accurately displaced at stable pressure and, for example, a waste of the fluid due to an excessively high pressure of the fluid flowing in the fluid channel may be suppressed.

In a liquid ejection device in an eighth mode of the present disclosure according to the first or second mode, the liquid channel has an inflow channel for the liquid to flow into the liquid reservoir and an outflow channel for the liquid to flow out from the liquid reservoir into the ejector.

According to the mode, the liquid channel has the inflow channel for the liquid to flow into the liquid reservoir and the outflow channel for the liquid to flow out from the liquid reservoir into the ejector. According to the configuration, the inflow and the outflow of the liquid to and from the liquid reservoir may be easily caused.

In a liquid ejection device in a ninth mode of the present disclosure according to the eighth mode, the liquid channel has a check valve.

According to the mode, the liquid channel has the check valve. According to the configuration, a backflow of the liquid may be suppressed in at least one of the inflow channel for the liquid to flow into the liquid reservoir and the outflow channel for the liquid to flow out from the liquid reservoir into the ejector.

A liquid ejection device in a tenth mode of the present disclosure according to the eighth mode further includes a first liquid feed unit and a second liquid feed unit each having the liquid reservoir and the displacement part as the liquid feeder, wherein the controller starts the ejection operation of the second liquid feed unit before an end of the ejection operation of the first liquid feed unit and starts the ejection operation of the first liquid feed unit before an end of the ejection operation of the second liquid feed unit in a duration in which the ejection operation is continuously performed.

According to the mode, the ejection operation of the second liquid feed unit is started before the end of the ejection operation of the first liquid feed unit and the ejection operation of the first liquid feed unit is started before the end of the ejection operation of the second liquid feed unit in the duration in which the ejection operation is continuously performed. When the ejection operation of the second liquid feed unit is started after the end of the ejection operation of the first liquid feed unit and when the ejection operation of the first liquid feed unit is started after the end of the ejection operation of the second liquid feed unit, there is a potential that the ejection operation is disturbed due to a time lag without execution of the ejection operation of the first liquid feed unit or the second liquid feed unit. However, the potential may be suppressed.

In a liquid ejection device in an eleventh mode of the present disclosure according to the tenth mode, the controller ends the suction operation of the second liquid feed unit before the end of the ejection operation of the first liquid feed unit and ends the suction operation of the first liquid feed unit before the end of the ejection operation of the second liquid feed unit in the duration.

According to the mode, the suction operation of the second liquid feed unit is ended before the end of the ejection operation of the first liquid feed unit and the suction operation of the first liquid feed unit is ended before the end of the ejection operation of the second liquid feed unit in the duration. According to the control, the time lag without execution of the ejection operation of the first liquid feed unit or the second liquid feed unit may be suppressed.

Embodiment 1

As below, embodiments of a liquid ejection device 1 according to the present disclosure will be explained with reference to the accompanying drawings. First, a liquid ejection device 1A according to Embodiment 1 of the present disclosure will be explained with reference to FIG. 1. The liquid ejection device 1A shown in FIG. 1 is a liquid ejection device including an ejector 5 configured to eject a liquid 3 in a continuous flow 3*a*, form the continuous flow 3*a* into droplets 3*b*, and cause a collision with an object O in a form of the droplets 3*b*, a liquid tank 2 containing the liquid 3, a liquid feeder 100, a liquid channel 4 coupling the ejector 5, the liquid tank 2, and the liquid feeder 100, and a controller 30.

The liquid ejection device 1A of the embodiment is configured to feed the liquid 3 contained in the liquid tank 2 to the ejector 5 via the liquid channel 4 by the liquid feeder 100 and eject the liquid 3 from the ejector 5 to the object O. A user performs various kinds of work by ejecting the liquid 3 from the ejector 5 and allowing the liquid 3 to collide with the desired object O using the liquid ejection device 1A of the embodiment. Various kinds of work include e.g., medical application such as dental therapy and cleansing, burring, peeling, chipping, excision, incision, fracturing, or the like on objects.

As shown in FIG. 1, the liquid feeder 100 has a liquid reservoir 10 in a cylinder shape having a liquid reservoir chamber coupled to the liquid channel 4 and configured to reserve the liquid 3. Further, the liquid feeder 100 has a displacement part 20 in a piston shape dividing the liquid reservoir 10 into a liquid reservoir chamber 15, a first pressure chamber 11, and a second pressure chamber 12 and displaced in a direction D1 and a direction D2 relative to the liquid reservoir 10 to change volumes of the liquid reservoir chamber 15, the first pressure chamber 11, and the second pressure chamber 12. Note that the liquid reservoir 10 and the displacement part 20 form a first liquid feed unit 101. Further, the liquid feeder 100 has an air pump 22 as a drive unit displacing the displacement part 20 relative to the liquid reservoir 10. The air pump 22 is coupled to an inlet and outlet port 11*a* provided in the first pressure chamber 11 and an inlet and outlet port 12*a* provided in the second pressure chamber 12 via tubes (not shown), and configured to set the first pressure chamber 11 and the second pressure chamber 12 at positive pressure or negative pressure by being driven under control of the controller 30. Note that the liquid reservoir 10 of the embodiment has the cylinder shape and the displacement part 20 of the embodiment has the piston shape, however, the present disclosure is not limited to the configuration. For example, the displacement part 20 may have a plunger structure.

Here, the displacement part 20 is placed to increase the volume of the liquid reservoir chamber 15 when displaced in the direction D2 to increase the volume of the first pressure chamber 11 relative to the liquid reservoir 10. On the other hand, the displacement part 20 is placed to decrease the volume of the liquid reservoir chamber 15 when displaced in the direction D1 to increase the volume of the second pressure chamber 12 relative to the liquid reservoir 10. The controller 30 controls the air pump 22 to displace the displacement part 20 in the direction D2 to increase the volume of the first pressure chamber 11 at a suction operation of suctioning the liquid 3 into the liquid reservoir chamber 15, and controls the air pump 22 to displace the displacement part 20 in the direction D1 to increase the volume of the second pressure chamber 12 at an ejection operation of ejecting the liquid 3 from the ejector 5.

As described above, in the liquid ejection device 1A of the embodiment, the liquid feeder 100 includes the liquid reservoir 10 and the displacement part 20 dividing the liquid reservoir 10 into the liquid reservoir chamber 15, the first pressure chamber 11, and the second pressure chamber 12 and displaced relative to the liquid reservoir 10 to change the volumes of the liquid reservoir chamber 15, the first pressure chamber 11, and the second pressure chamber 12. That is, in the liquid ejection device 1A of the embodiment, the first pressure chamber 11 and the second pressure chamber 12 as a plurality of pressure applying parts for moving the displacement part 20 are provided for one liquid reservoir 10. Accordingly, in the liquid ejection device 1A of the embodiment, the controller 30 may finely control and execute the ejection operation and the suction operation of the liquid 3.

Here, the drive unit in the liquid ejection device 1A of the embodiment is the air pump 22 displacing the displacement part 20 relative to the liquid reservoir 10 by inputting and outputting air as a fluid in and out of at least one of the first pressure chamber 11 and the second pressure chamber 12. The drive unit has the above described configuration, and thereby, the displacement part 20 may be accurately displaced relative to the liquid reservoir 10 and the controller 30 may particularly finely control and execute the ejection operation and the suction operation of the liquid 3. Note that the drive unit of the embodiment uses air as the fluid, however, the usable fluid is not limited to air, but another gas than air e.g., carbon dioxide can be used.

In the liquid ejection device 1A of the embodiment, pressure measurement instruments such as pressure meters (not shown) are provided near the inlet and outlet port 11*a* and the inlet and outlet port 12*a*, and the controller 30 may control pressures within the tubes connecting to the inlet and outlet port 11*a* and the inlet and outlet port 12*a* by driving the air pump 22 with reference to the measurement results of the pressure measurement instruments. Note that, instead of adjusting the actuation pressure by controlling the air pump 22, the pressure may be controlled using a regulator. Under the control, the displacement part 20 may be displaced relative to the liquid reservoir 10 at a stable pressure.

Further, as shown in FIG. 1, the liquid ejection device 1A of the embodiment has an inflow channel 4A for the liquid 3 to flow into the liquid reservoir 10 and an outflow channel 4B for the liquid 3 to flow out from the liquid reservoir 10 into the ejector 5. The liquid channel 4 has the above described configuration, and thereby, the inflow and the outflow of the liquid 3 to and from the liquid reservoir 10 may be easily caused.

Furthermore, as shown in FIG. 1, the liquid ejection device 1A of the embodiment has a check valve 6 in the inflow channel 4A of the liquid channel 4. The liquid channel 4 has the above described configuration, and thereby, a backflow of the liquid 3 may be suppressed in the inflow channel 4A for the liquid 3 to flow into the liquid reservoir 10. Note that the backflow of the liquid 3 may be suppressed, for example, by electromagnetic control to open and close a two-way valve in place of the check valve 6.

The ejector 5 may have only one nozzle ejecting the liquid 3, or a plurality of nozzles ejecting the liquid 3. Note that the nozzle diameter is preferably equal to or smaller than 150 μm. This is because the configuration ejecting the liquid 3 in the continuous flow 3*a*, forming the continuous flow 3*a* into the droplets 3*b*, and causing a collision with the object O in the form of the droplets 3*b* may be preferably formed. Further, the flow velocity within the nozzle at the ejection of the liquid 3 is preferably from 20 m/s to 300 m/s. Furthermore, the ejection flow rate of the liquid 3 is preferably equal to or lower than 0.5 L/min. The coupling position of the liquid channel 4 to the liquid reservoir chamber 15 is not particularly limited, however, provision at the upside of the liquid reservoir chamber 15 in the vertical direction may suppress air bubbles entering the liquid channel 4 even when air enters the liquid reservoir chamber 15.

Embodiment 2

Figure 2:
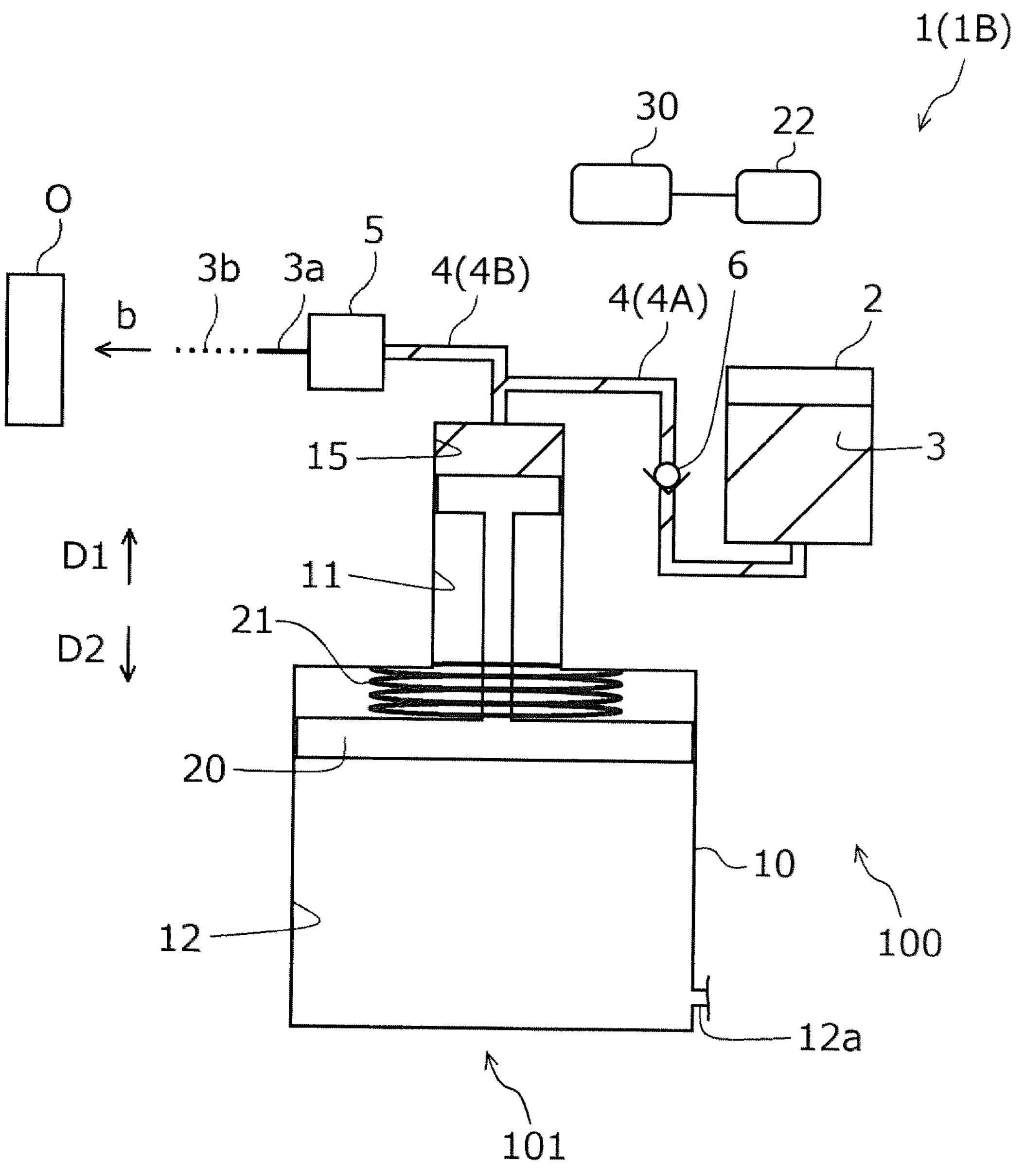
FIG. 2 is a schematic diagram showing a liquid ejection device of Embodiment 2 of the present disclosure.

As below, a liquid ejection device 1B of Embodiment 2 will be explained with reference to FIG. 2. The liquid ejection device 1B of the embodiment is the same as the liquid ejection device 1A of Embodiment 1 except the configuration to be described. Accordingly, the liquid ejection device 1B of the embodiment has the same characteristics as the liquid ejection device 1A of Embodiment 1 except the parts to be described. In FIG. 2, the common component members with the above described Embodiment 1 have the same signs and the detailed description thereof will be omitted.

As shown in FIG. 1, in the liquid ejection device 1A of the Embodiment 1, the drive unit is formed by the air pump 22 serving as both the pressure applying part for the first pressure chamber 11 and the pressure applying part for the second pressure chamber 12. On the other hand, as shown in FIG. 2, in the liquid ejection device 1B of the embodiment, the inlet and outlet port 11*a* connecting to the air pump 22 is not provided in the first pressure chamber 11, but a coil spring 21 is placed in the first pressure chamber 11 instead.

In other words, the liquid ejection device 1B of the embodiment has the coil spring 21 as an elastic member in at least one of the first pressure chamber and the second pressure chamber as the drive unit, and is configured to displace the displacement part 20 relative to the liquid reservoir 10 by an elastic force of the coil spring 21. The drive unit has the above described configuration, and thereby, the configuration displacing the displacement part 20 may be simpler.

Embodiment 3

Figure 3:
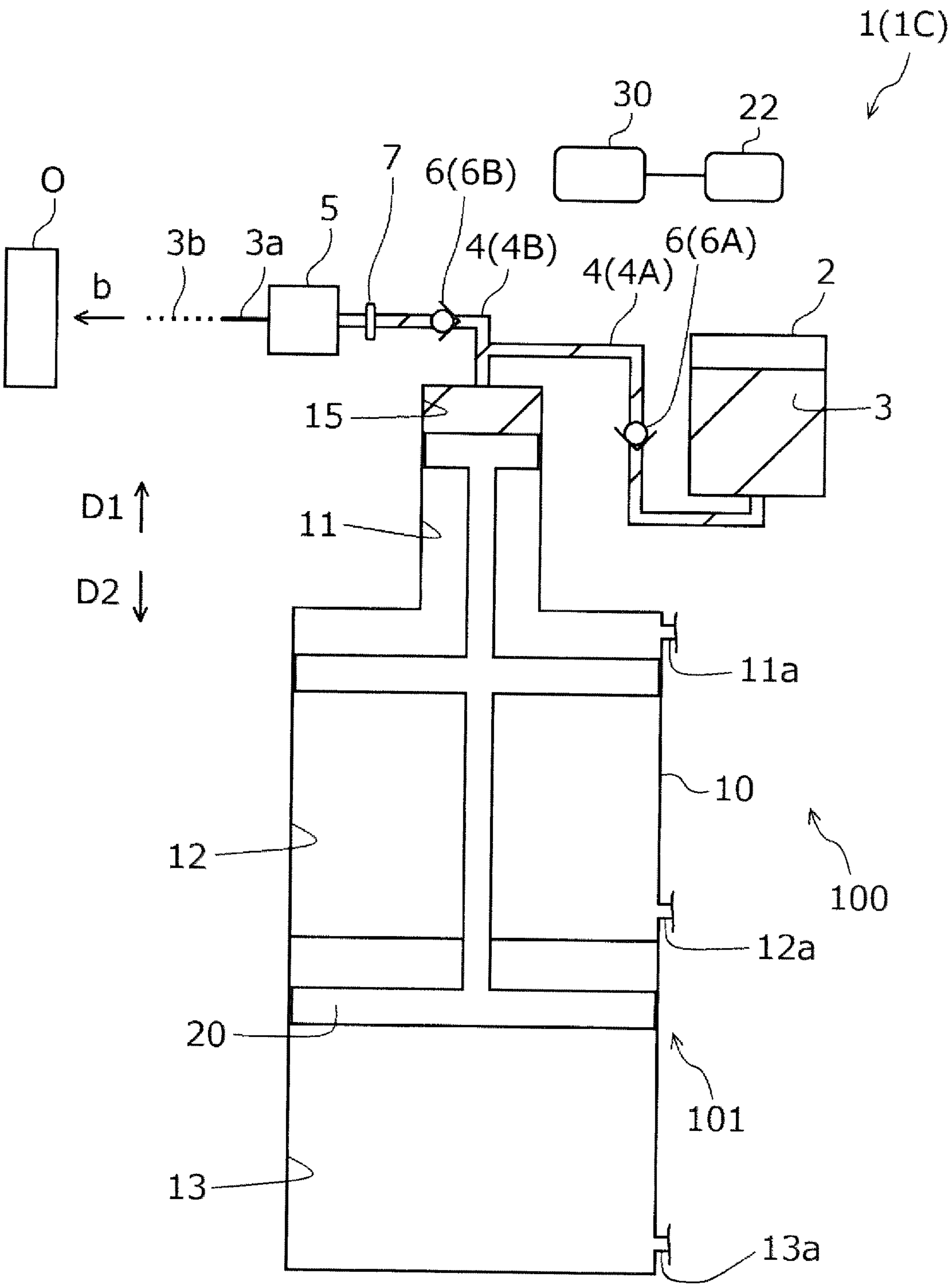
FIG. 3 is a schematic diagram showing a liquid ejection device of Embodiment 3 of the present disclosure.

As below, a liquid ejection device 1C of Embodiment 3 will be explained with reference to FIG. 3. The liquid ejection device 1C of the embodiment is the same as the liquid ejection devices 1 of Embodiment 1 and Embodiment 2 except the configuration to be described. Accordingly, the liquid ejection device 1C of the embodiment has the same characteristics as the liquid ejection devices 1 of Embodiment 1 and Embodiment 2 except the parts to be described. In FIG. 3, the common component members with the above described Embodiment 1 and Embodiment 2 have the same signs and the detailed description thereof will be omitted.

As shown in FIGS. 1 and 2, in the liquid ejection devices 1 of Embodiment 1 and Embodiment 2, the liquid reservoir 10 is divided into the three chambers of the liquid reservoir chamber 15, the first pressure chamber 11, and the second pressure chamber 12 by the displacement part 20. On the other hand, as shown in FIG. 3, in the liquid ejection device 1C of the embodiment, the liquid reservoir 10 is divided into four chambers of the liquid reservoir chamber 15, the first pressure chamber 11, the second pressure chamber 12, and a third pressure chamber 13. Further, an inlet and outlet port 13*a* connecting to the air pump 22 is provided in the third pressure chamber 13. The number of chambers of the liquid reservoir 10 divided by the displacement part 20 may be three, four, or more, not particularly limited as long as there are at least the liquid reservoir chamber 15, the first pressure chamber 11, and the second pressure chamber 12.

Further, as shown in FIG. 3, the liquid ejection device 1C of the embodiment not only has a check valve 6A in the inflow channel 4A but also has a check valve 6B in the outflow channel 4B. The check valve 6 is provided in at least one of the inflow channel 4A and the outflow channel 4B, and thereby, the backflow of the liquid 3 may be suppressed in at least one of the inflow channel 4A for the liquid 3 to flow into the liquid reservoir 10 and the outflow channel 4B for the liquid 3 to flow out from the liquid reservoir 10 into the ejector 5.

Further, as shown in FIG. 3, the liquid ejection device 1C of the embodiment has a filter 7 in the outflow channel 4B. The hole diameter of the filter 7 is smaller than the nozzle diameter of the ejector 5. According to the configuration, nozzle clogging of the ejector 5 due to entry of foreign matter into the nozzle of the ejector 5 may be suppressed.

Embodiment 4

Figure 4:
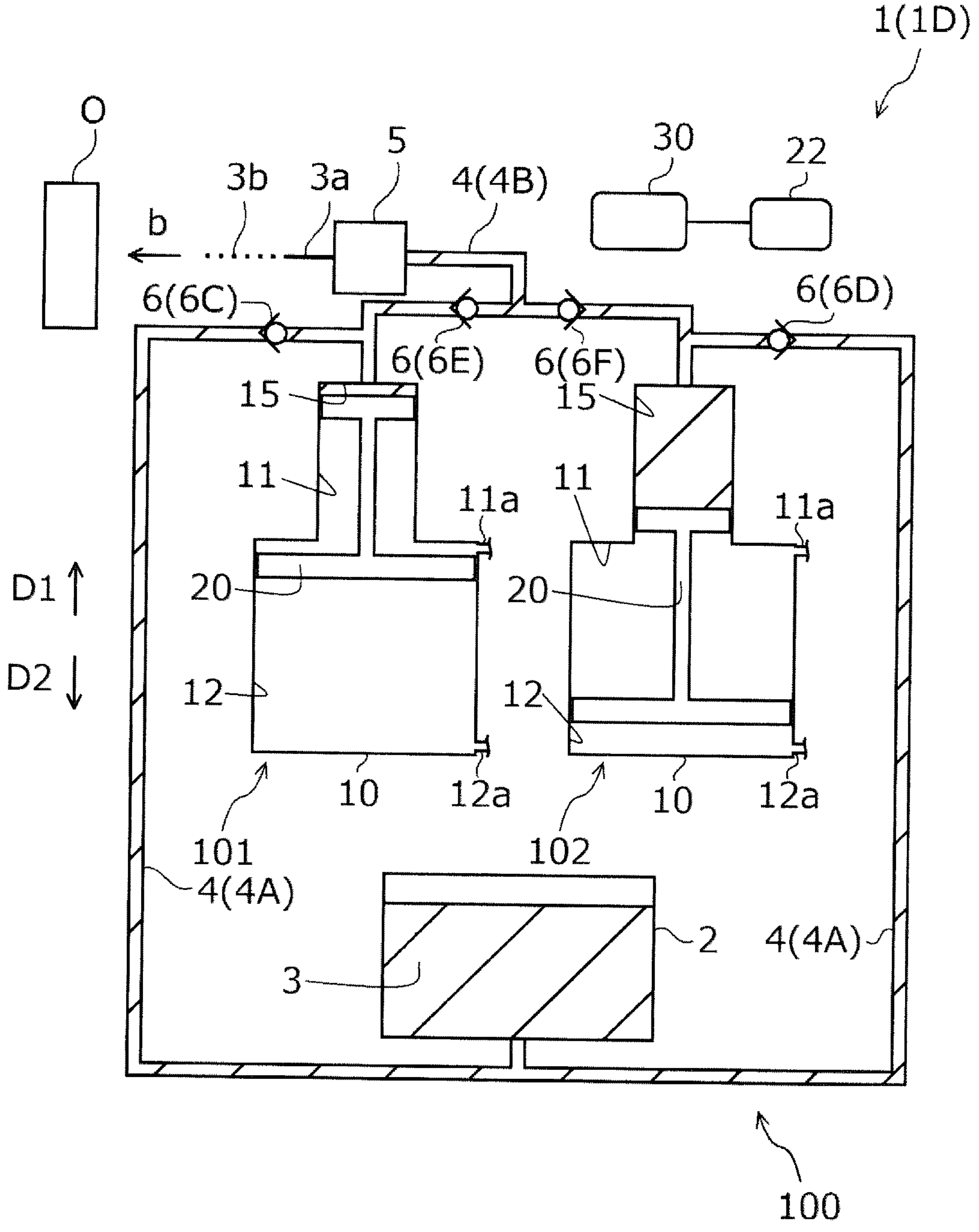
FIG. 4 is a schematic diagram showing a liquid ejection device of Embodiment 4 of the present disclosure.

As below, a liquid ejection device 1D of Embodiment 4 will be explained with reference to FIG. 4. The liquid ejection device 1D of the embodiment is the same as the liquid ejection devices 1 of Embodiment 1 to Embodiment 3 except the configuration to be described. Accordingly, the liquid ejection device 1D of the embodiment has the same characteristics as the liquid ejection devices 1 of Embodiment 1 to Embodiment 3 except the parts to be described. In FIG. 4, the common component members with the above described Embodiment 1 to Embodiment 3 have the same signs and the detailed description thereof will be omitted.

As shown in FIGS. 1 to 3, in the liquid ejection devices 1 of Embodiment 1 to Embodiment 3, as the liquid feed unit having the liquid reservoir 10 and the displacement part 20, the only one first liquid feed unit 101 is provided. On the other hand, as shown in FIG. 4, in the liquid ejection device 1D of the embodiment, as the liquid feed unit having the liquid reservoir 10 and the displacement part 20, a second liquid feed unit 102 is provided in addition to the first liquid feed unit 101. The first liquid feed unit 101 and the second liquid feed unit 102 have the same configuration. Further, in the embodiment, the two liquid feed units of the first liquid feed unit 101 and the second liquid feed unit 102 are provided, however, three or more liquid feed units may be provided.

Here, in the liquid ejection device 1D of the embodiment, the controller 30 is configured to start the ejection operation of the second liquid feed unit 102 before the end of the ejection operation of the first liquid feed unit 101 and start the ejection operation of the first liquid feed unit 101 before the end of the ejection operation of the second liquid feed unit 102 in a duration in which the ejection operation is continuously performed. In other words, for example, at the ejection operation by movement of the displacement part 20 of the first liquid feed unit 101 in the direction D1 relative to the liquid reservoir 10, when the ejection operation is further continuously performed, the displacement part 20 of the second liquid feed unit 102 is moved in the direction D1 relative to the liquid reservoir 10 before the displacement part 20 of the first liquid feed unit 101 is started to be moved in the direction D2 relative to the liquid reservoir 10. When the ejection operation of the second liquid feed unit 102 is started after the end of the ejection operation of the first liquid feed unit 101 and when the ejection operation of the first liquid feed unit 101 is started after the end of the ejection operation of the second liquid feed unit 102, there may be a time lag without execution of the ejection operation of the first liquid feed unit 101 or the second liquid feed unit 102. With the time lag, there is a potential that the ejection operation is disturbed. However, the controller 30 performs the above described control, and thereby, the potential may be suppressed.

Further, the controller 30 controls to end the suction operation of the second liquid feed unit 102 before the end of the ejection operation of the first liquid feed unit 101 and end the suction operation of the first liquid feed unit 101 before the end of the ejection operation of the second liquid feed unit 102 in the duration in which the ejection operation is continuously performed. Under the control, the time lag without execution of the ejection operation of the first liquid feed unit 101 or the second liquid feed unit 102 may be suppressed.

Note that, as shown in FIG. 4, in the liquid ejection device 1D of the embodiment, four check valves 6 of a check valve 6C, a check valve 6D, a check valve 6E, and a check valve 6F are provided. Accordingly, the backflow of the liquid 3 in the liquid channel 4 may be effectively suppressed. Note that the number and the placement of the check valves 6 are not particularly limited.

Embodiment 5

Figure 5:
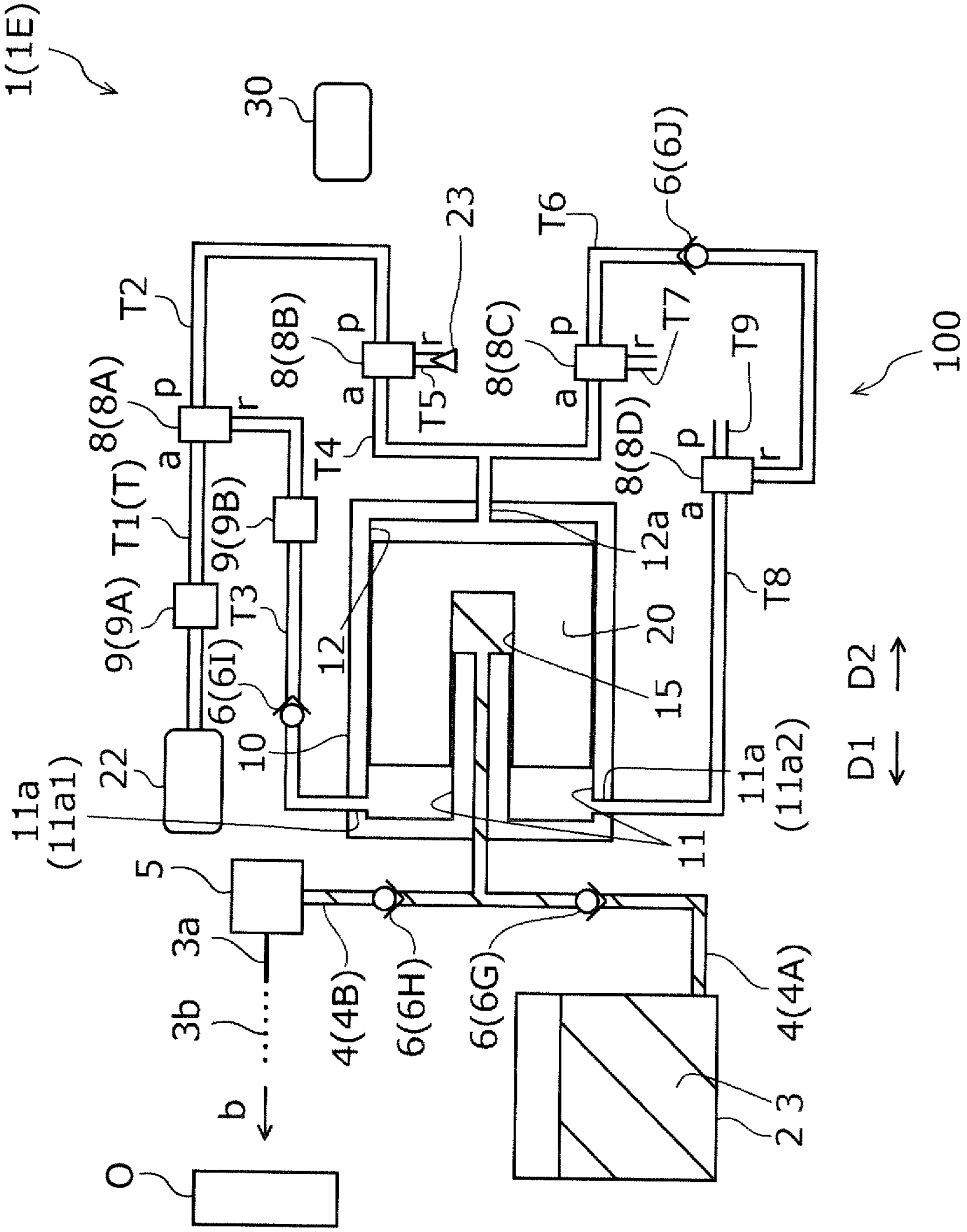
FIG. 5 is a schematic diagram showing a liquid ejection device of Embodiment 5 of the present disclosure.

As below, a liquid ejection device 1E of Embodiment 5 will be explained with reference to FIG. 5. The liquid ejection device 1E of the embodiment is the same as the liquid ejection devices 1 of Embodiment 1 to Embodiment 4 except the configuration to be described. Accordingly, the liquid ejection device 1E of the embodiment has the same characteristics as the liquid ejection devices 1 of Embodiment 1 to Embodiment 4 except the parts to be described. In FIG. 5, the common component members with the above described Embodiment 1 to Embodiment 4 have the same signs and the detailed description thereof will be omitted.

In the liquid ejection device 1E of the embodiment, the liquid feeder 100 has a fluid channel T, specifically, fluid channels T1 to T9 connecting the first pressure chamber 11 and the second pressure chamber 12, and the air used in one of the ejection operation and the suction operation can be reused in the other. As shown in FIG. 5, like the liquid ejection devices 1 of Embodiment to Embodiment 4, the liquid ejection device 1E of the embodiment includes the ejector 5 configured to eject the liquid 3 in the continuous flow 3*a*, form the continuous flow 3*a* into the droplets 3*b*, and cause a collision with the object O in the form of the droplets 3*b*, the liquid tank 2 containing the liquid 3, the liquid feeder 100, the liquid channel 4 coupling the ejector 5, the liquid tank 2, and the liquid feeder 100, and the controller 30. A check valve 6G is provided in the inflow channel 4A and a check valve 6H is provided in the outflow channel 4B of the liquid channel 4.

Further, as shown in FIG. 5, the liquid ejection device 1E of the embodiment has the air pump 22 as the drive unit and one end of the fluid channel T1 is connected to the air pump 22. The other end of the fluid channel T1 is connected to an a-terminal of a valve 8A. In the fluid channel T1, a regulator 9A is provided as the regulator 9 and the air flowing in the fluid channel T1 can be regulated at e.g., predetermined high pressure by the regulator 9A. Note that the liquid ejection device 1E of the embodiment includes four valves 8 of the valve 8A, a valve 8B, a valve 8C, and a valve 8D, and all valves have the same configuration. Specifically, each valve 8 has the a-terminal, a p-terminal, and an r-terminal and is configured to change between a state in which the a-terminal and the p-terminal are coupled and a state in which the a-terminal and the r-terminal are coupled under control of the controller 30.

One end of the fluid channel T2 is connected to the p-terminal of the valve 8A. The other end of the fluid channel T2 is connected to the p-terminal of the valve 8B. On the other hand, one end of the fluid channel T3 is connected to the r-terminal of the valve 8A. The other end of the fluid channel T3 is connected to the inlet and outlet port 11*a* of the first pressure chamber 11. Note that the two inlet and outlet ports 11*a* are provided in the liquid reservoir 10 of the embodiment, and the other end of the fluid channel T3 is connected to one inlet and outlet port 11*al* of the two. In the fluid channel T3, a regulator 9B is provided as the regulator 9 and the air flowing in the fluid channel T1 can be regulated at e.g., predetermined low to medium pressure by the regulator 9B. Further, a check valve 6I is provided in the fluid channel T3. According to the configuration, a flow of the air into the first pressure chamber 11 can be caused at the low to medium pressure from the air pump 22 via the fluid channel T1 and the fluid channel T3.

One end of the fluid channel T4 is connected to the a-terminal of the valve 8B. The fluid channel T4 is divided in three directions, and another end of the fluid channel T4 is connected to the inlet and outlet port 12*a* of the second pressure chamber 12 and the other end of the fluid channel T4 is connected to the a-terminal of the valve 8C. Further, one end of the fluid channel T5 is connected to the r-terminal of the valve 8B and the other end of the fluid channel T5 is closed by a plug 23. According to the configuration, a flow of the air into the second pressure chamber 12 can be caused at the high pressure from the air pump 22 via the fluid channel T1, the fluid channel T2, and the fluid channel T4.

One end of the fluid channel T6 is connected to the p-terminal of the valve 8C. The other end of the fluid channel T6 is connected to the r-terminal of the valve 8D. In the fluid channel T6, a check valve 6J is provided. One end of the fluid channel T7 is connected to the r-terminal of the valve 8C and the other end of the fluid channel T7 is opened to the atmosphere.

One end of the fluid channel T8 is connected to the a-terminal of the valve 8D. The other end of the fluid channel T8 is connected to an inlet and outlet port 11*a*2 of the first pressure chamber 11. Note that the inlet and outlet port 11*a*2 to which the other end of the fluid channel T8 is connected is another inlet and outlet port than the inlet and outlet port 11*al* to which the other end of the fluid channel T3 is connected. Further, one end of the fluid channel T9 is connected to the p-terminal of the valve 8D and the other end of the fluid channel T9 is opened to the atmosphere.

Here, the ejection operation and the suction operation of the liquid ejection device 1E of the embodiment are explained. Note that the following various kinds of control are performed by the controller 30. Note that the control of the valves 8 etc. may be manually performed by the user. When the ejection operation is started in the liquid ejection device 1E of the embodiment, the controller 30 couples the a-terminals and the p-terminals in all of the valve 8A, the valve 8B, the valve 8C, and the valve 8D. Then, the fluid channel T1, the fluid channel T2, the fluid channel T4, and the fluid channel T6 are at high pressure by the air flowing in from the air pump 22. At the same time, the second pressure chamber 12 is also at high pressure by the air flowing in from the fluid channel T4 via the inlet and outlet port 12*a*. On the other hand, the fluid channel T8 and the fluid channel T9 are coupled, and thereby, the fluid channel T3 and the fluid channel T8 are opened to the atmosphere with the first pressure chamber 11. Accordingly, the pressure of the second pressure chamber 12 is higher than the pressure of the first pressure chamber 11, and the displacement part 20 is displaced in the direction D1 relative to the liquid reservoir 10.

Then, after the ejection operation is started and while the ejection operation is continued, the valve 8B is changed from the state in which the a-terminal and the p-terminal are coupled to the state in which the a-terminal and the r-terminal are coupled. Note that the fluid channel T5 is closed by the plug 23, and the pressure is not largely changed from the fluid channel T1 to the fluid channel T9. However, concurrently, the coupling between the fluid channel T2 and the fluid channel T4 is released and the air flowing from the air pump 22 into the fluid channel T4 is blocked.

Then, with the end of the ejection operation, the valve 8D is changed from the state in which the a-terminal and the p-terminal are coupled to the state in which the a-terminal and the r-terminal are coupled. Then, the fluid channel T8 is no longer opened to the atmosphere and becomes at the medium pressure due to the air flowing in from the fluid channel T6. Then, with that, the first pressure chamber 11 and a part to the check valve 6I of the fluid channel T3 are set at the medium pressure. In other words, the air of the second pressure chamber 12 flows into the first pressure chamber 11 via the fluid channel T4, the fluid channel T6, and the fluid channel T8, and the first pressure chamber 11 is set at the medium pressure.

Then, the suction operation is started, and the valve 8C is changed from the state in which the a-terminal and the p-terminal are coupled to the state in which the a-terminal and the r-terminal are coupled. Then, with the fluid channel T4 connected to the fluid channel T7 and opened to the atmosphere, the second pressure chamber 12 is also opened to the atmosphere. As described above, the first pressure chamber 11 is set at the medium pressure, the pressure of the first pressure chamber 11 is higher than the pressure of the second pressure chamber 12, and the displacement part 20 is displaced in the direction D2 relative to the liquid reservoir 10. Here, the valve 8B does not use the air flowing in from the air pump 22 because the a-terminal and the p-terminal are not coupled. That is, in the liquid ejection device 1E of the embodiment, the air used in the ejection operation can be reused in the suction operation.

Note that the liquid ejection device 1E of the embodiment may execute the suction operation using the air flowing in from the air pump 22 in addition to the above described suction operation. In this case, from the above described state, the valve 8A is further changed from the state in which the a-terminal and the p-terminal are coupled to the state in which the a-terminal and the r-terminal are coupled. Then, a flow of the air into the first pressure chamber 11 from the air pump 22 via the fluid channel T3 may be caused.

As described above, in the liquid ejection device 1E of the embodiment, the liquid feeder 100 has the fluid channel T connecting the first pressure chamber 11 and the second pressure chamber 12. Further, the controller 30 may cause a flow of the air as a fluid into the second pressure chamber 12 at the ejection operation and a flow of the air to be used for the suction operation from the second pressure chamber 12 into the first pressure chamber 11. According to the configuration, the air used in the ejection operation and the suction operation may be reused. Note that the liquid ejection device 1E of the embodiment reuses the air used in the ejection operation in the suction operation, however, the air used in the suction operation may be reused in the ejection operation by, for example, placement change of the fluid channel T.

Further, in the liquid ejection device 1E of the embodiment, the liquid feeder 100 has the fluid channels T7 and T9 as atmospheric open channels opening the air to the atmosphere in a part of the fluid channel T. According to the configuration, the configuration reusing the fluid used in the ejection operation and the suction operation may be simpler.

In the liquid ejection device 1E of the embodiment, the liquid feeder 100 has the valves 8A to 8D as flow direction changing parts coupled to the fluid channel T in three or more locations and configured to change the direction in which the air flows from a first direction in which the a-terminal and the p-terminal are coupled to a second direction in which the a-terminal and the r-terminal are coupled. Further, the controller 30 may control the valves 8A to 8D to change the direction in which the air flows between the first direction and the second direction. According to the configuration, in the configuration reusing the air used in the ejection operation and the suction operation, the displacement part 20 may be accurately displaced and the controller 30 may particularly finely control and execute the ejection operation and the suction operation of the liquid.

In the liquid ejection device 1E of the embodiment, the liquid feeder 100 has the regulator 9B regulating the pressure of the air flowing in the fluid channel T3. Accordingly, the liquid ejection device 1E of the embodiment may accurately displace the displacement part 20 at stable pressure and, for example, may suppress a waste of the air due to an excessively high pressure of the air flowing in the fluid channel T3.

The present disclosure is not limited to the above described embodiments, but may be realized in various configurations without departing from the scope thereof. The technical features in the embodiments corresponding to the technical features in the respective configurations described in SUMMARY can be appropriately replaced or combined in order to solve part or all of the above described problems or achieve part or all of the above described effects. Further, the technical features not described as essential features in the specification can be appropriately deleted.

What is claimed is:

1. A liquid ejection device comprising:

an ejector configured to eject a liquid in a continuous flow, form the continuous flow into droplets, and cause a collision with an object in a form of the droplets;

a liquid feeder;

a liquid channel coupling the ejector and the liquid feeder; and a controller, wherein the liquid feeder includes a liquid reservoir having a liquid reservoir chamber coupled to the liquid channel and configured to reserve the liquid, a displacement part dividing the liquid reservoir into the liquid reservoir chamber, a first pressure chamber, and a second pressure chamber and displaced relative to the liquid reservoir to change a volume of the liquid reservoir chamber, a volume of the first pressure chamber, and a volume of the second pressure chamber, and a drive unit displacing the displacement part relative to the liquid reservoir, the displacement part is placed to increase the volume of the liquid reservoir chamber when displaced to increase the volume of the first pressure chamber relative to the volume of the liquid reservoir, and decrease the volume of the liquid reservoir chamber when displaced to increase the volume of the second pressure chamber relative to the volume of the liquid reservoir, the controller controls the drive unit to displace the displacement part to increase the volume of the first pressure chamber at a suction operation of suctioning the liquid into the liquid reservoir chamber, and controls the drive unit to displace the displacement part to increase the volume of the second pressure chamber at an ejection operation of ejecting the liquid from the ejector, and the drive unit has a coil spring disposed inside at least one of the first pressure chamber or the second pressure chamber and displaces the displacement part relative to the liquid reservoir by an elastic force of the coil spring.

2. The liquid ejection device according to claim 1, wherein the drive unit displaces the displacement part relative to the liquid reservoir by inputting and outputting a fluid into or out of at least one of the first pressure chamber and the second pressure chamber.

3. The liquid ejection device according to claim 2, wherein the liquid feeder has a fluid channel connecting the first pressure chamber and the second pressure chamber, and the controller controls the fluid to flow into the second pressure chamber at the ejection operation and controls the fluid to be used for the suction operation to flow from the second pressure chamber into the first pressure chamber.

4. The liquid ejection device according to claim 3, wherein the liquid feeder has an atmospheric open channel opening the fluid to an atmosphere in a part of the fluid channel.

5. The liquid ejection device according to claim 3, wherein the liquid feeder has a flow direction changing part coupled to the fluid channel in three or more locations and configured to change a direction in which the fluid flows from a first direction to a second direction, and the controller controls the flow direction changing part to change the direction in which the fluid flows between the first direction and the second direction.

6. The liquid ejection device according to claim 3, wherein the liquid feeder has a regulator regulating a pressure of the fluid flowing in the fluid channel.

7. The liquid ejection device according to claim 1, wherein the liquid channel has an inflow channel for the liquid to flow into the liquid reservoir and an outflow channel for the liquid to flow out from the liquid reservoir into the ejector.

8. The liquid ejection device according to claim 7, wherein the liquid channel has a check valve.

9. The liquid ejection device according to claim 7, further comprising a first liquid feed unit and a second liquid feed unit each having the liquid reservoir and the displacement part as the liquid feeder, wherein the controller starts the ejection operation of the second liquid feed unit before an end of the ejection operation of the first liquid feed unit and starts the ejection operation of the first liquid feed unit before an end of the ejection operation of the second liquid feed unit in a duration in which the ejection operation is continuously performed.

10. The liquid ejection device according to claim 9, wherein the controller ends the suction operation of the second liquid feed unit before the end of the ejection operation of the first liquid feed unit and ends the suction operation of the first liquid feed unit before the end of the ejection operation of the second liquid feed unit in the duration.

* * * * *